BEST AVAILABLE COPY

T857022

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 368

690,071

CELLULOSE ESTERS AND POLYESTERS STABILIZED WITH METAL CHELATES OF GLYOXIMES

John W. Tamblyn, Box 92, Jonas Ridge, N.C. 28641, and Gerald R. Lappin and Gordon C. Newland, both % Tennessee Eastman Company, P.O. Box 511, Kingsport, Tenn. 37662

Filed Dec. 13, 1967. Published Dec. 10, 1968

Class 106—176

No Drawing. 14 Pages Specification

Stabilized compositions comprising cellulose esters or polyesters and a stabilizing amount of a metal chelate of the following formula:

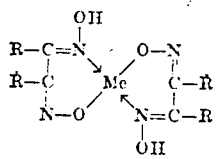

wherein Me is a metal selected from the group consisting of Co, Ni, Mn, and Cu; and R contains from 1 to about 20 carbon atoms and is selected from the group consisting of alkyl, aryl, alkaryl,

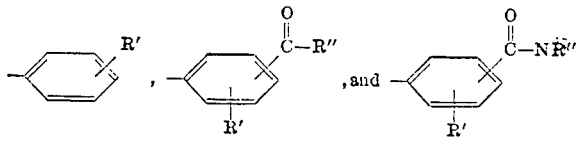

wherein R′ is alkyl or aryl as defined above, alkoxy containing from 1 to 20 carbon atoms, hydroxy, cyano, carboxy, acetyl, or halogen; and R″ is alkoxy, alkyl, or aryl as hereinbefore defined are protected against weathering, sunlight, and ultraviolent light by the chelate.